(12) United States Patent
Mooney et al.

(10) Patent No.: US 11,400,008 B2
(45) Date of Patent: Aug. 2, 2022

(54) DYNAMIC MOUNTING MECHANISM FOR AN EXOSKELETON

(71) Applicant: Dephy, Inc., Maynard, MA (US)

(72) Inventors: Luke Mooney, Sudbury, MA (US); Jean-Francois Duval, Belmont, MA (US); William Marvin, Canton, MA (US)

(73) Assignee: Dephy, Inc., Maynard, MA (US)

( * ) Notice: Subject to any disclaimer, the term of this patent is extended or adjusted under 35 U.S.C. 154(b) by 619 days.

(21) Appl. No.: 16/365,024

(22) Filed: Mar. 26, 2019

(65) Prior Publication Data
US 2019/0298599 A1  Oct. 3, 2019

Related U.S. Application Data

(60) Provisional application No. 62/648,576, filed on Mar. 27, 2018.

(51) Int. Cl.
*A61H 3/00* (2006.01)
*A61H 1/02* (2006.01)
*B25J 9/00* (2006.01)
*B66D 1/34* (2006.01)

(52) U.S. Cl.
CPC ............. *A61H 1/0237* (2013.01); *A61H 3/00* (2013.01); *B25J 9/0006* (2013.01); *B66D 1/34* (2013.01); *A61H 2003/007* (2013.01); *A61H 2201/165* (2013.01); *A61H 2205/106* (2013.01)

(58) Field of Classification Search
CPC .. A61H 1/0237; A61H 3/00; A61H 2003/007; A61H 2201/165; A61H 2205/106; B25J 9/0006
See application file for complete search history.

(56) References Cited

U.S. PATENT DOCUMENTS

| | | |
|---|---|---|
| 5,363,025 A | 11/1994 | Colling |
| 8,235,924 B2 | 8/2012 | Bachmann et al. |
| 8,394,038 B2 | 3/2013 | Ashihara et al. |
| 8,516,918 B2 | 8/2013 | Jacobsen et al. |
| 8,702,811 B2 | 4/2014 | Ragnarsdottir et al. |

(Continued)

FOREIGN PATENT DOCUMENTS

| | | |
|---|---|---|
| JP | 2011092507 A | 5/2011 |
| WO | 2010091377 A2 | 8/2010 |
| WO | 2016164395 A2 | 10/2016 |

OTHER PUBLICATIONS

Mooney and Herr; Journal of NeuroEngineering and Rehabilitation (2016) 13:4; "Biomechanical walking mechanisms underlying the metabolic reduction caused by an autonomous exoskeleton", pp. 1-12; Published Jan. 28, 2016.

(Continued)

*Primary Examiner* — Timothy A Stanis
(74) *Attorney, Agent, or Firm* — Barlow, Josephs & Holmes, Ltd.; David R. Josephs (57) ABSTRACT

The present invention is directed to the affixion of an exoskeleton device that can include multiple rotational degrees of freedom in its attachment mechanism to approximate linear motion orthogonal to the person's line of action. The present invention can include one or more additional, non-parallel degrees of freedom. The present invention provides a sliding mechanism for adjusting the exoskeleton mating point along the user's body.

18 Claims, 9 Drawing Sheets

(56) References Cited

U.S. PATENT DOCUMENTS

| | | |
|---|---|---|
| 8,731,716 B2 | 5/2014 | Jacobsen et al. |
| 8,771,370 B2 | 7/2014 | Albrecht-Laatsch et al. |
| 8,852,292 B2 | 10/2014 | Ragnarsdottir et al. |
| 8,894,592 B2 | 11/2014 | Amundson et al. |
| 9,445,931 B2 | 9/2016 | Imaida et al. |
| 9,808,073 B1 * | 11/2017 | Maxwell ................ A61H 3/008 |
| 2006/0211966 A1 | 9/2006 | Hatton et al. |
| 2009/0222105 A1 | 9/2009 | Clausen |
| 2010/0076360 A1 | 3/2010 | Shimada et al. |
| 2010/0130893 A1 | 5/2010 | Sankai |
| 2010/0256538 A1 | 10/2010 | Ikeuchi |
| 2012/0259259 A1 * | 10/2012 | Chugunov ............ A61F 5/0193 602/16 |
| 2012/0283845 A1 | 11/2012 | Herr et al. |
| 2013/0012852 A1 | 1/2013 | Imaida et al. |
| 2013/0102934 A1 | 4/2013 | Ikeuchi |
| 2014/0100493 A1 * | 4/2014 | Craig ...................... A61H 3/00 601/35 |
| 2014/0330431 A1 | 11/2014 | Hollander et al. |
| 2015/0173993 A1 | 6/2015 | Walsh et al. |
| 2015/0209214 A1 | 7/2015 | Herr et al. |
| 2015/0351991 A1 * | 12/2015 | Amundson ............ A61H 1/024 623/24 |
| 2015/0351995 A1 * | 12/2015 | Zoss ...................... B25J 9/0006 623/32 |
| 2015/0374573 A1 | 12/2015 | Horst et al. |
| 2016/0331557 A1 | 11/2016 | Tong et al. |
| 2016/0331625 A1 * | 11/2016 | Sankai .................. B25J 9/0006 |
| 2018/0200135 A1 * | 7/2018 | Tung ..................... A61H 1/024 |
| 2018/0256433 A1 * | 9/2018 | Pucci .................... A61H 1/024 |
| 2019/0070061 A1 * | 3/2019 | Choi ....................... A61F 2/64 |

OTHER PUBLICATIONS

Mooney et al., Journal of Neuroengineering and Rehabilitation 2014, 11:151; "Autonomous exoskeleton reduces metabolic cost of human walking"; Published Nov. 3, 2014.

Twist. Merriam Webster Online Dictionary, definition 1C, https://www.merriam-webster.com/dictionary/twist; Dec. 20, 2017.

* cited by examiner

DYNAMIC MOUNTING MECHANISM FOR AN EXOSKELETON

CROSS-REFERENCE TO RELATED APPLICATION

This application claims benefit of earlier filed U.S. Provisional Patent Application No. 62/648,576, filed on Mar. 27, 2018, the entire contents of which are incorporated herein by reference.

GOVERNMENT SUPPORT

This invention was made with government support under W911QY-16-C-0072 from the United States Army.

BACKGROUND

The invention relates generally to an exoskeleton, which is an external augmentative device worn by a person to enhance their motor functions. This augmentation can come from applying a force which is complementary to the user's intended motion. The applied force can be used to increase the user's natural strength by means of adding an additional force in series to the natural movement. The applied force can also be used to increase endurance through minimizing the user's effort to complete a task. As the exoskeleton applies a portion of the required force to complete a task, the metabolic cost to the user is reduced, increasing their endurance at said task. Exoskeletons can also increase mobility by increasing the strength and/or frequency of the user's motion. When coupled with the added endurance, an assistive exoskeleton's enhanced strength allows a user to complete a motion for longer periods of time at strengths beyond the capabilities they would have without augmentation. For example, by applying assistive force to the normal gait cycle, the frequency of the gait and distance covered during the initial swing phase of the gait can be increased. This augmentation of a fundamental human movement can result in a greater distance traveled over time, at a lower relative metabolic cost to the user.

Exoskeletons can be considered passive or active depending how they apply their force, and their reliance on energy storage. Passive exoskeletons do not require an energy source, such as a battery. Active devices require an energy source to power electronics and usually include force/power applying actuators. The exoskeleton functions by applying its active or passive augmentation through parallel structures to the user's skeletal system. If the exoskeleton does not act in parallel with the user's innate motility systems, it will lose efficiency, and possibly even resist the user's force.

It is also ideal for the parallel structures to be designed in such a way that does not inhibit the user's natural range of motion. Any impingement of the user's natural abilities offsets the potential benefits of augmentation, and additionally correlates to lower user comfort. Reducing the user's range of motion also impedes their ability to perform normal tasks, limiting the use cases for the exoskeleton. Having rigid limits or mis-alignment contrary to the user's range of motion creates shear between the person and the mechanical structure. Any user attempts to extend beyond the limited range of motion imposed by the exoskeleton will result in mechanical interference between the exoskeleton mounting bodies and the user's skin, greatly decreasing user comfort and resulting performance.

In order to enhance the user's intended motion, the exoskeleton must move complimentary to the user's musculoskeletal system. Any unintended deviations from the user's natural movements can result in counterapplication of augmentation, and an additional loss of effectiveness. To this end, it is desirable for the system to be rigidly affixed to the user's musculoskeletal system in order to maximize the transmission of force to the ground, while not being so rigid as to restrict their usual range of motion.

Effective exoskeleton design is highly reliant on proper alignment of human and exoskeleton joints. Misalignment of internal human joints and external robotic joints results in shearing between the mating surface between the human and exoskeleton. Any amount of surface shear in the mating interface will likely create user discomfort as the shear leads to inadequate pressure dispersion. This shear can also put an uneven load on the exoskeleton system, creating inefficiencies in the transmission of force to the user. Additionally, the shearing can lead to increased movement of the exoskeleton with respect to the body of the user. In all cases, misalignments between the line of actions of the human and exoskeleton will decrease efficiency and increase user discomfort.

By using a single degree of freedom (DOF) joint, alignment can be accomplished with rigid fixturing of the human to the exoskeleton. Rigid fixturing initially creates the alignment required between the human and robotic joints to avoid shear. A rigid assembly, however, creates additional static misalignments though the difficulty in accepting users of differing size. While assumptions can be made to fit the majority of users, this limits the ability of the exoskeleton to be perfectly aligned with all users. The general deviation in length of the lower leg bones can be significant enough to create mechanical device mis-alignment across a population of users. In an attempt to minimize this affect, each time the user dons the exoskeleton, they may adjust the system to the optimal position to avoid an inefficient and uncomfortable session.

An additional downside of rigid alignment techniques are difficulties with dynamic misalignments that occur naturally during motion. As the user moves, their soft tissue deflects while the solid structure around them does not. This difference in positioning creates dynamic misalignments that decrease exoskeleton efficiency and increase user discomfort.

A solution to this problem is to design an exoskeleton fixturing device that has additional degrees of freedom that maintain stiffness in the direction of actuation, yet allows for flexibility in other directions. If rigidity in the direction of action is not maintained, the exoskeleton will not transmit force to the user efficiently. If the intended range of device motion is too rigid, it will inhibit natural user motion. An added refinement of this design is accommodating and emulating the multiple degrees of freedom experienced during natural movement with a device rigidly affixed to the body. While the human system has multiple compact joints with multiple degree of freedom, creating a mechanical analog increases mechanical complexity and device footprint.

It is ideal to have an exoskeleton mounting solution that minimizes weight, since added weight decreases the effectiveness of the augmentation. It is also ideal to accommodate dynamic changes in joint alignment, while ensuring the user can easily adjust the device to personalize fit. An additional favorable design consideration would be to have a system that is able to align itself properly, even when the user dons it incorrectly.

It is ideal for the system to accommodate the multiple degrees of freedom that human joints accomplish. Any decrease in user range of motion reduces device efficacy and user satisfaction. Therefore, it is favorable to undertake the complexities involved in multiple joints and multiple degrees of freedom, even though adding mechanical degrees of freedom inherently adds failure points to the design and potentially reduces the overall robustness of the device. Additionally, any decrease in system robustness decreases reliability and decreases the use cases for the exoskeleton.

SUMMARY OF THE INVENTION

The present invention provides new advantages not found in currently available exoskeleton devices. The current invention additionally overcomes many disadvantages of currently available exoskeletons employing rigid structures close to the body.

In one exemplary embodiment, the invention is generally directed to the novel and unique exoskeleton mounting designs that address the problems associated with user comfort, restricting user range of motion, and user compatibility. The present mechanical system can allow an exoskeleton device to attach to a user and dynamically align to the user's natural joint axis. Such a device can work on single or multi DOF joints and provides for fixation adjustments by the user.

It is therefore an object of the present invention to provide a new and novel exoskeleton mounting device that is adjustable and does not inhibit the user's expected range of motion. The current invention is intended to address the problems associated with the prior art of exoskeleton devices.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE INVENTION

Certain exemplary embodiments will now be described to provide an overall understanding of the principles of the structure, function, manufacture, and use of the device and methods disclosed herein. One or more examples of these embodiments are illustrated in the accompanying drawings.

Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like proximal, distal, top, bottom, up, or down are used, they are not intended to limit the systems, devices, and methods disclosed herein. A person skilled in the art will recognize that these terms are merely relative to the system and device being discussed and are not universal. Further, for ease of discussion, the present invention is discussed in connection with a lower limb exoskeleton but the invention is also related and applicable to any exoskeleton.

In general, an embodiment of a novel exoskeleton is shown in FIGS. 1-9. The embodiment of FIGS. 1-9 shows a novel attachment mechanism having a linkage assemble which permits a pad face to maintain a substantially fixed linear distance from, for example, a shoe which the exoskeleton is attached. Through rotational movement of the linkage assembly, the pad face can transmit forces from the exoskeleton to the appendage of the user without applying any shear forces between the pad face and the appendage. The removal, or substantial minimization, of shear forces can reduce injuries to the user and minimize a source of inefficiency in the exoskeleton. The device can generally include a clamping member which can be slidably secured to a structural member. The clamping member can include a swing or support arm which is able, at a first end, to rotate about a single axis which may be normal to a face of the structural member. The support arm can be generally "L" shaped such that the shorter portion can be secured to the clamp and the longer perpendicular portion can be secured to a pad. At the second end of the support arm, the pad can be pivotally fixed. The pad can be configured to pivot about a first axis of rotation, which can be substantially parallel to the single axis, and a second axis which is perpendicular to both the first and second axes and normal to a face of the pad. In some embodiments, the pad can further include a fixturing mechanism to secure the pad to the user.

Figure 1:
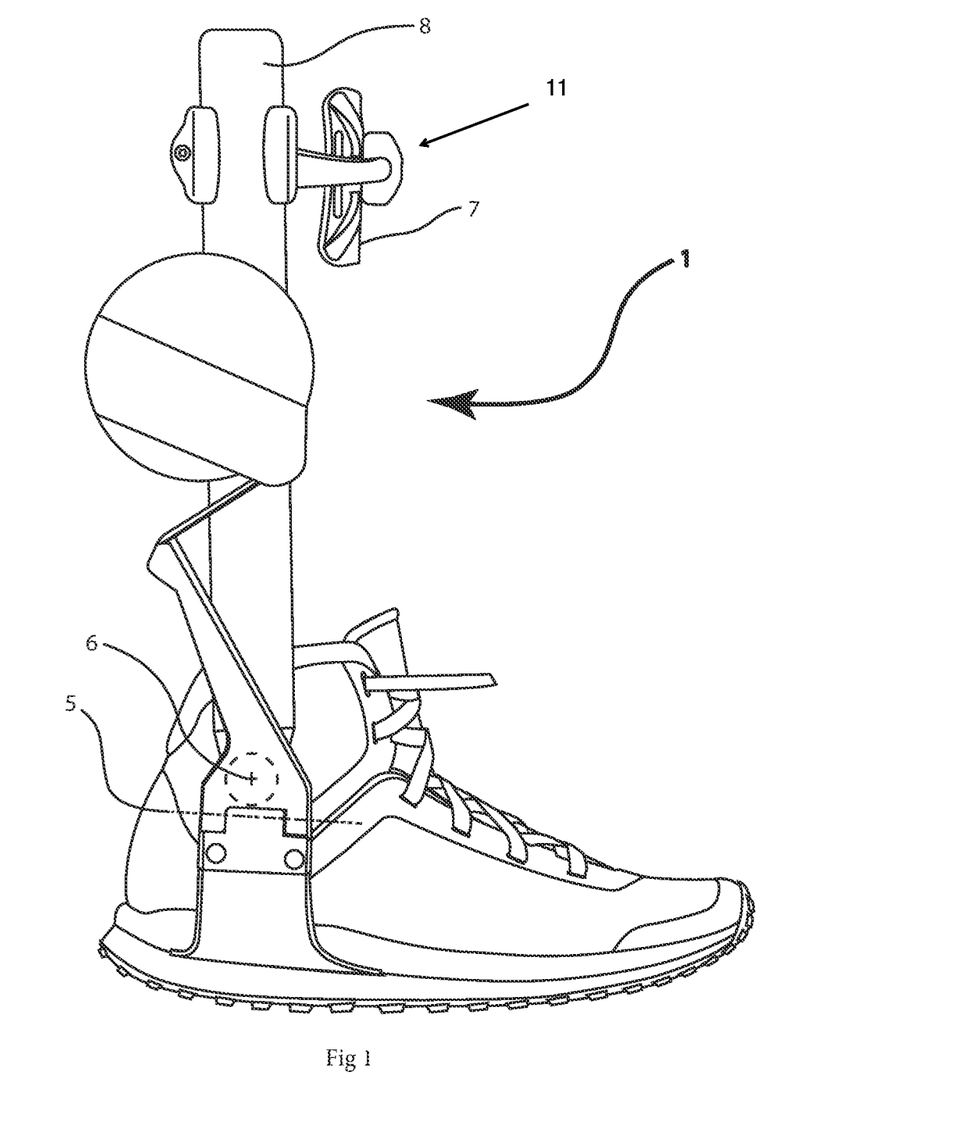
FIG. 1 shows a right side elevational view of an exoskeleton mounting device.

Referring to FIG. 1 of the mechanism, the current invention is shown in a general summary view alongside its application to an existing novel exoskeleton 1. Such an exoskeleton can be the exoskeleton disclosed in U.S. application Ser. No. 15/782,306, entitled "Unidirectional Actuated Exoskeleton Device," filed Oct. 12, 2017, incorporated herein in its entirety. The primary rotational axis 6 of the exoskeleton 1 can be coupled to the secondary rotational axis 5 to provide the multiple rotational degrees of freedom alongside the target ankle joint. The main solid member, or upright, 8 can be fixed to this primary rotational axis 6 to provide the primary parallel structure of the exoskeleton 1 along the user's appendage.

Figure 2:
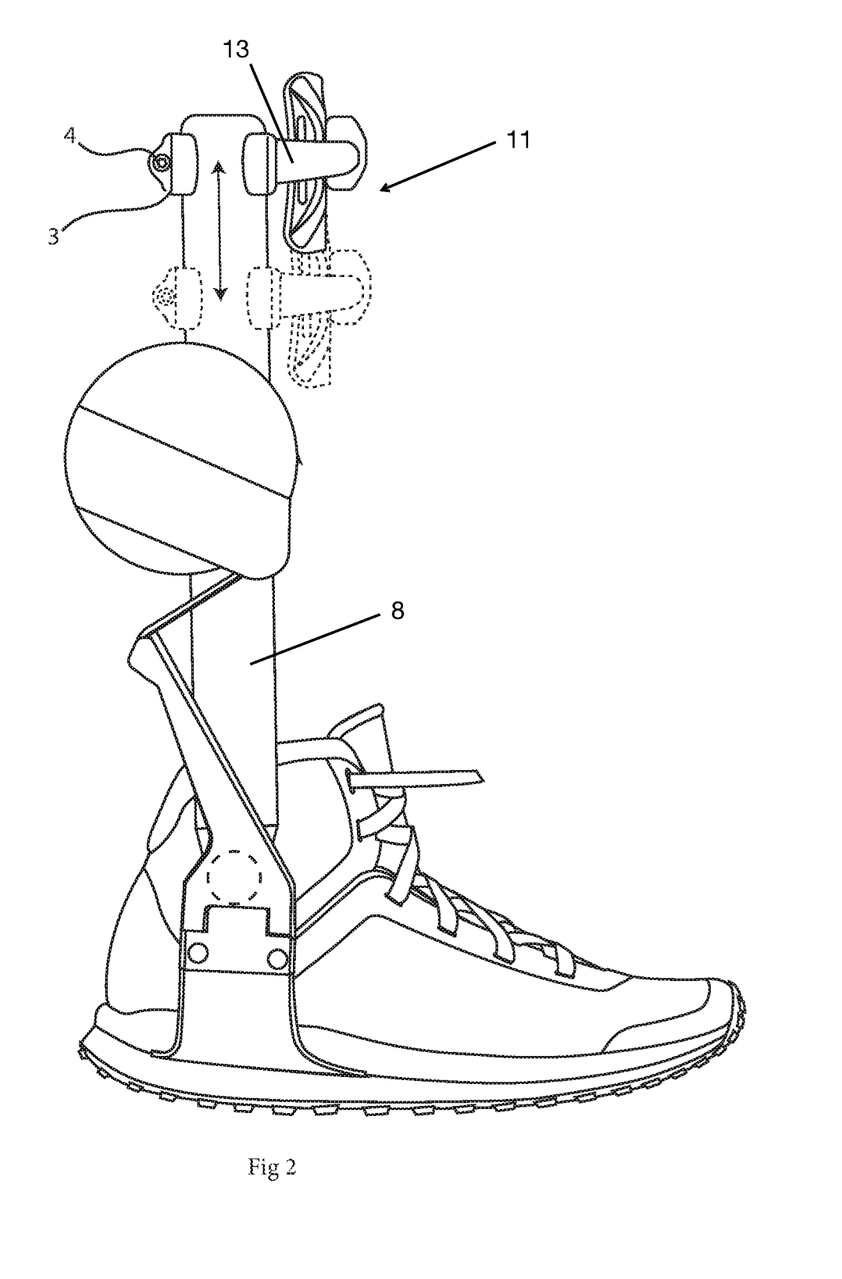
FIG. 2 shows a right side elevational view of the exoskeleton mounting device of FIG. 1 being adjusted.

Referring to FIG. 2, the primary fixturing, support bracket, or clamp, 3 of the invention 11 can selectively float, or be height adjustable, on the structural member 8 of the exoskeleton. The assembly 11 can freely slide or shift longitudinally along the structural member 8 until it is fixed in place at an appropriate height for the user. In an alternative embodiment, the primary fixturing 3 can be a support bracket that is rigidly affixed to the structural member 8 of the exoskeleton such that the primary fixturing 3 is fixed with respect to the structural member 8. When the assembly 11 is at the desired height, a clamping mechanism 3 can be applied to fix the assembly 11 relative to the structural member 8. For example, the clamping mechanism can be clamped via clamping screw 4, as shown in FIG. 2. In alternative embodiments the clamping mechanism 3 can be any mechanical, electrical, magnetic, or chemical fixation means that are strong enough to transmit the necessary forces from the exoskeleton 1 to the user. This arrangement can allow for the user to adjust the exoskeleton 1 to improve alignment for efficiency and comfort. In one embodiment, the user can adjust the fixture until the cushioned pad 7 is proximal to the widest part of the target body segment, for example the shin of the user. In alternative embodiments, the cushioned pad 7 can be adjusted to any desired location along a user of the device 1. In some embodiments, additional care may be taken to ensure the top surface of the support arm 13 is perpendicular to the pad face 7.

Figure 3:
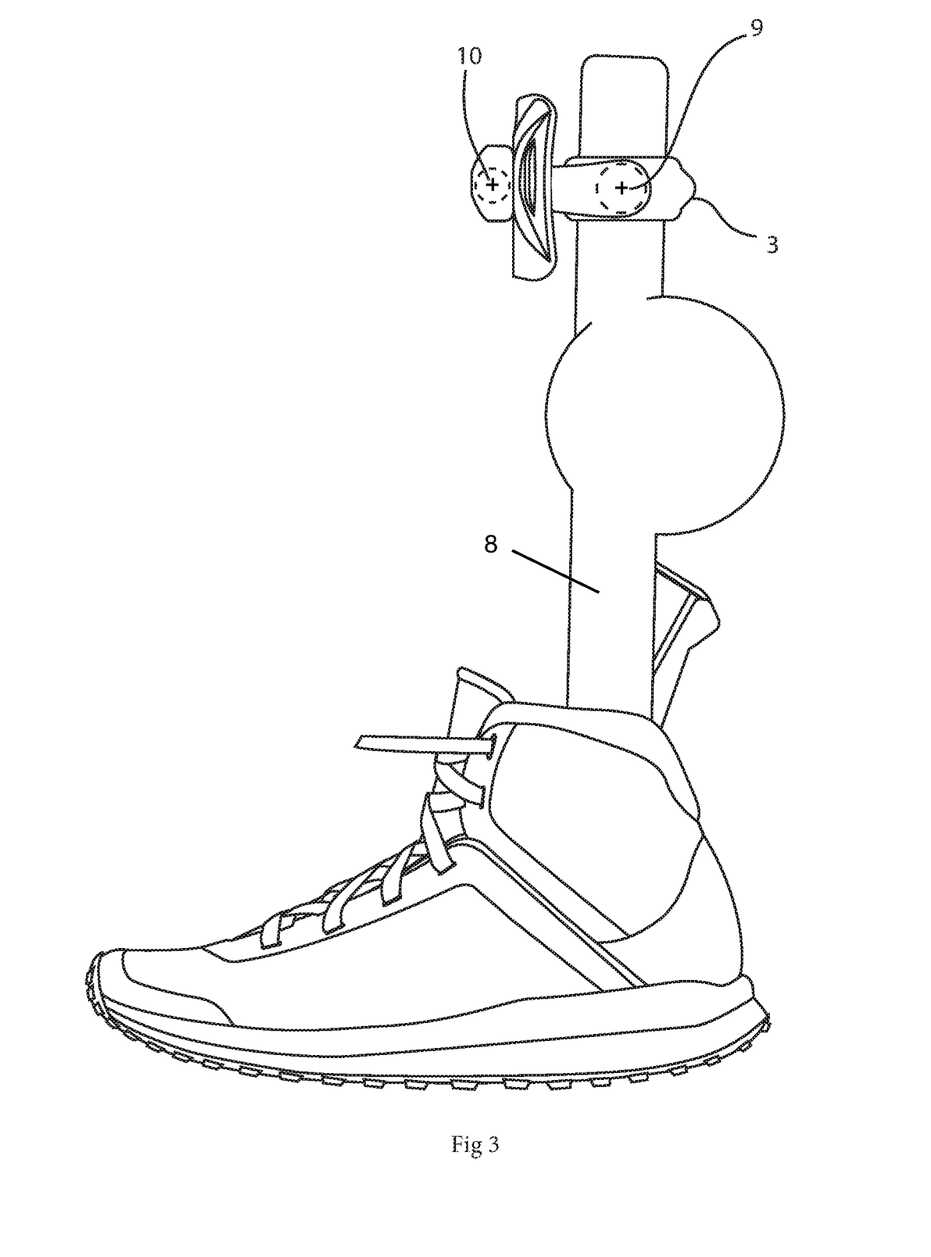
FIG. 3 shows a right side elevational view of the exoskeleton mounting device of FIG. 1.
Figure 4:
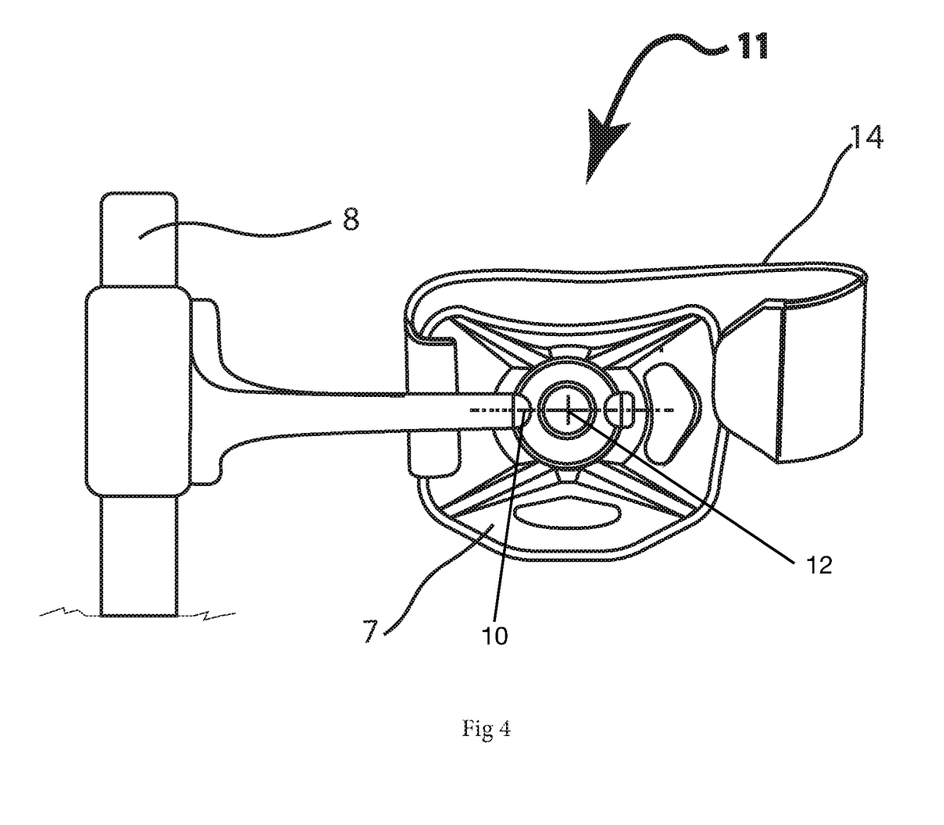
FIG. 4 front view of the mounting device of FIG. 1.

Referring to FIGS. 3 and 4, the support arm 13 of the assembly 11 can be rotatable about a first axis of rotation 9 to place the padded guard surface 7 against the user's body. The primary fixturing clamp 3 can be attached to the support arm 13 through the use of one or more rotary bearings, a pin joint, and/or one or more bushings. The pad 7 can be rotatably secured to the support arm 13 about, at least, a second axis of rotation 10 to comfortably seat the pad 7 flush against the body. The second axis of rotation 10 can be parallel to and offset from the first axis of rotation 9. The support arm 13 and the pad can be connected together with one or more rotary bearings, one or more pin joints, and/or one or more bushings. The pad 7 can be kept rigid against the body segment using an additional fixturing mechanism 14. The fixturing mechanism 14 can be a strap, but can be a magnetic clasp, ratcheting belt, or other soft adjustable tension element wrapping or binding the device to the leg. With the strap 14 securing the device 11 to the user, a non-parallel rotational degree of freedom 12 can ensure the mounting face of the pad 7 is flush against the body.

Figure 5A:
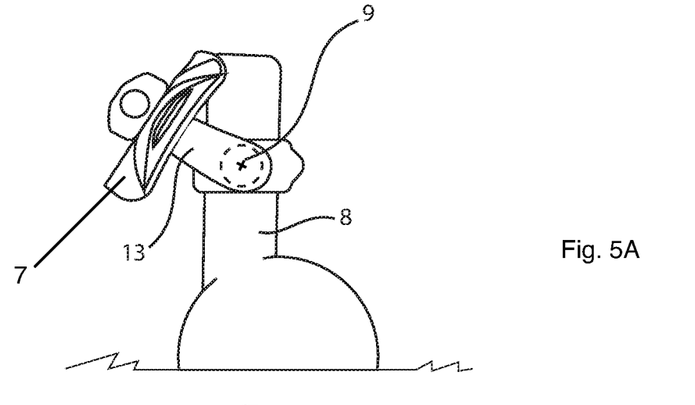
FIGS. 5A-5C are partial left side views of the mounting device of FIG. 1 being rotated about a single first axis.
Figure 5B:
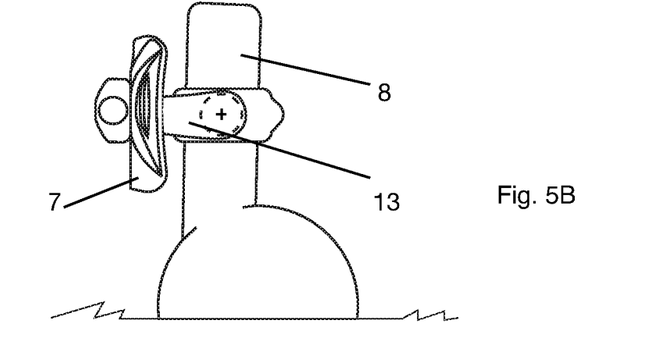
Figure 5C:
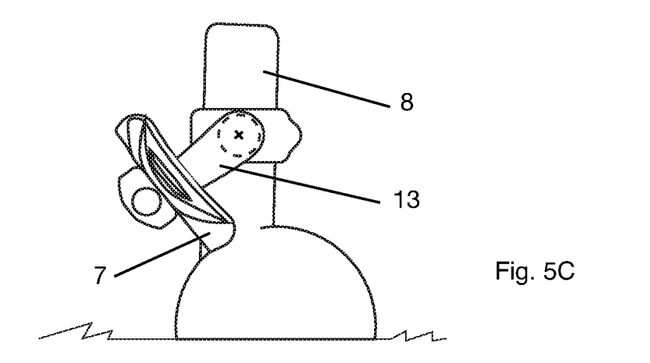

Referring to FIGS. 5A-C and 6A-C, the first axis of rotation 9 and the second axis of rotation 10 are shown normal to the parallel rotational axis. FIGS. 5A-C illustrate one of the major mounting adjustments of the support arm 13, that are possible with the inclusion of the first axis of rotation 9, relative to the structural member 8. The degree of freedom of the support arm 13 about the first axis of rotation 9 alone will result in the transfer of shear forces to the user at the top and bottom of the pad 7. The inclusion of the second axis of rotation 9 between the pad 7 and the support arm 13 can reduces shear forces applied to the user's body by translating the possible shear into a self-centering force to maintain parallelism. As the shear force is naturally encountered from the movements illustrated in FIGS. 5A-C on the top and bottom faces of the pad 7, the second axis of rotation 10 maintains the parallelism between the pad 7 and user, as seen in phantom in at least FIG. 9.

Figure 7A:
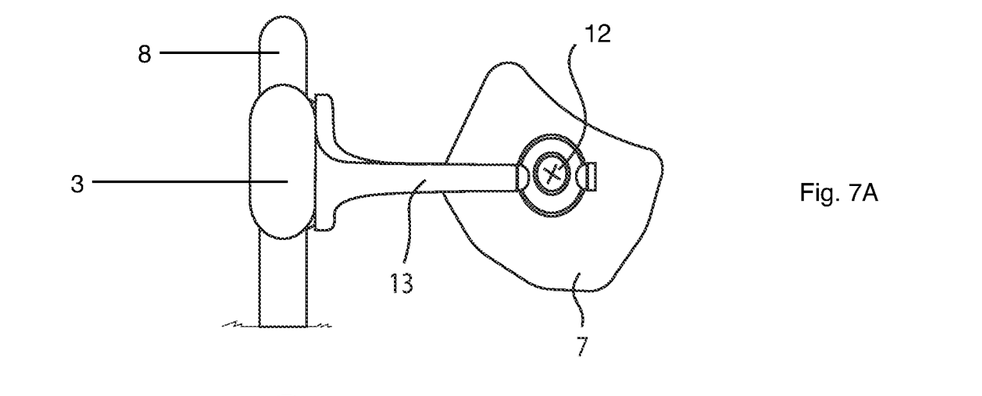
FIGS. 7A-7C are partial front side views of the mounting device of FIG. 1 being rotated about a single third axis.
Figure 7B:
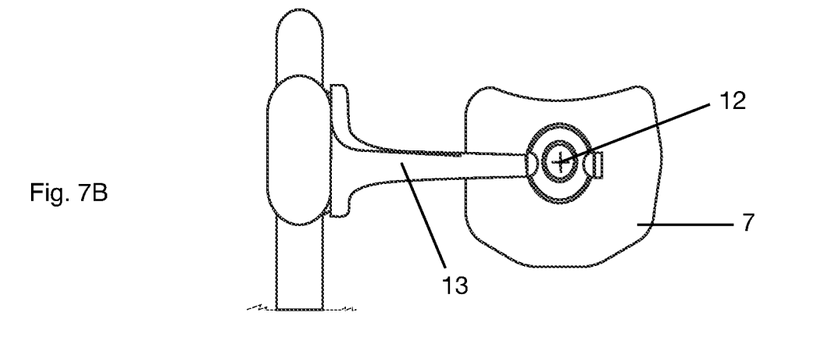
Figure 7C:
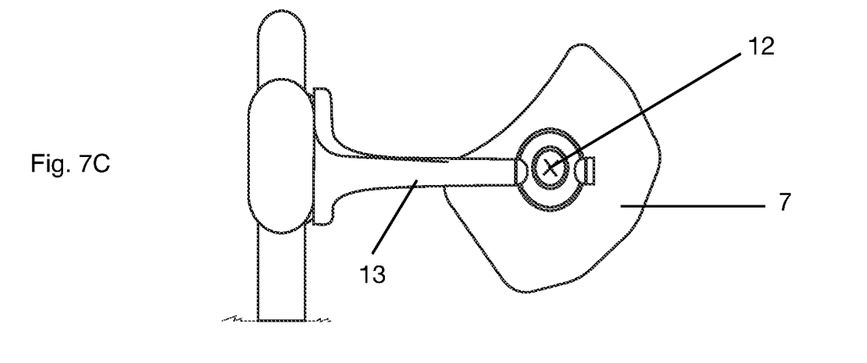

Referring to FIGS. 7A-C, with the novel implementation of multiple parallel axes 9, 10 and an additional non-parallel rotational axis 12, the mating surface of the pad 7 can, advantageously, center itself on the user's body. In some embodiments, the mounting pad 7 can have an ergonomic concave shape which can be complementary to the convex shape of the user's target body segment. The pad 7 can find its center, relative to the user's body, automatically as it is tightened to the body due to the complementary shape. As depicted in FIGS. 7A-C, the pad 7 can be allowed to rotate about the non-parallel third axis of rotation 12 while being adjusted. The concave shape of the mounting pad 7 coupled with a rotational degree of freedom at the target human joint 6 can constrain the exoskeleton structural member 8 to maintain parallelism with the user's skeletal system. Since the mounting hardware 14 will only fixture normal to the line of action, the applied clamping force can constrain the second axis of rotation 10 to maintain parallelism with the target body segment. The additional first axis of rotation 9 constrains the exoskeleton to be parallel with the underlying skeletal system from its rotational degree of freedom. In some embodiments, the support arm 13 of the assembly 11 can include only the first axis of rotation 9, the second axis of rotation 10 and the non-parallel rotational axis 12.

Figure 8A:
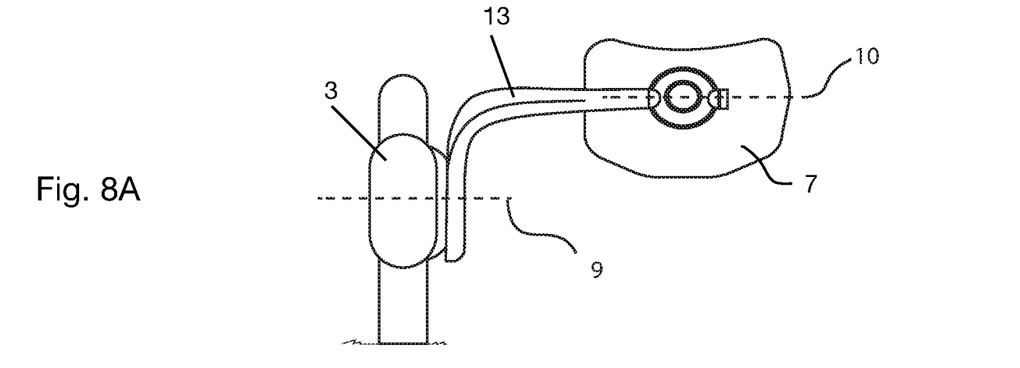
FIGS. 8A-8C are partial rear side views of the mounting device of FIG. 1 being rotated about the first and second axes to keep the mounting pad normal to the front plane.
Figure 8B:
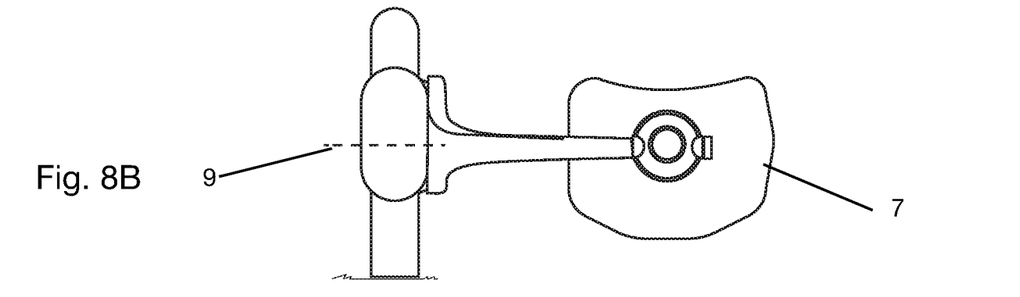
Figure 8C:
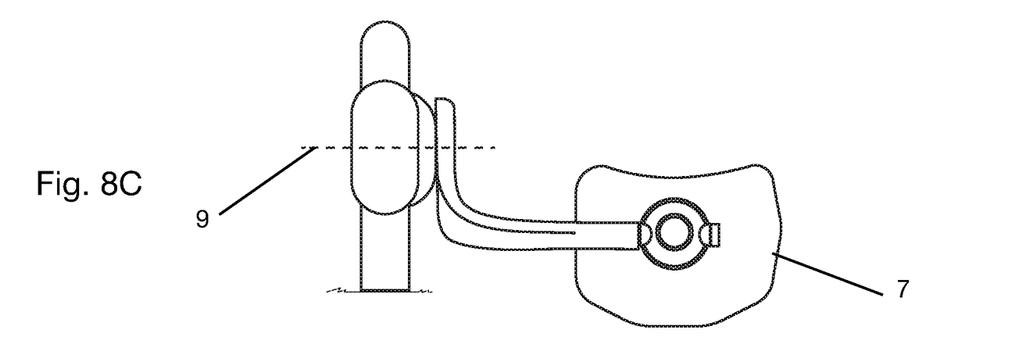

Referring to FIGS. 8A-C, the combination of three distinct rotational degrees of freedom, about three axes 9, 10, 12, can also increases the user comfort by allowing for natural realignment of the assembly 11. During use, it is often the case that misalignment can occur. The combination of three degrees of rotational freedom can provide the main structural element 8 of the exoskeleton a constrained degree of travel along the skeletal support, ensuring alignment without applying sheering forces. This allows for contact to be kept between the mating faces of the exoskeleton and user, while still minimizing the skin shear that would occur with a static mounting point. This dynamic mounting point 11 also helps to maintain the user's regular range of motion by moving with the body rather than rigidly acting against it.

Figure 6A:
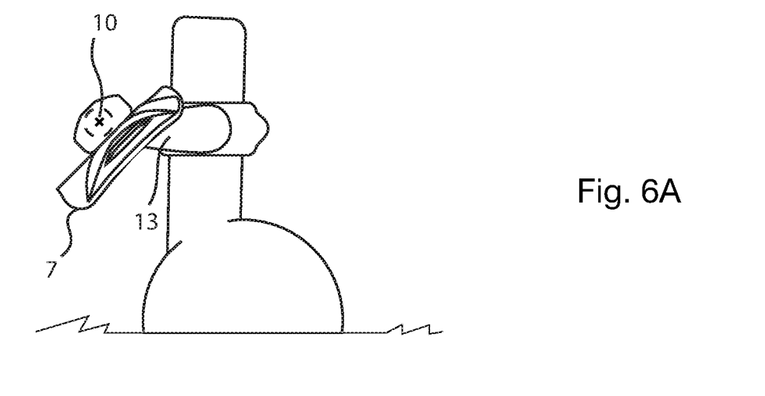
FIGS. 6A-6C are partial left side views of the mounting device of FIG. 1 being rotated about a single second axis.
Figure 6B:
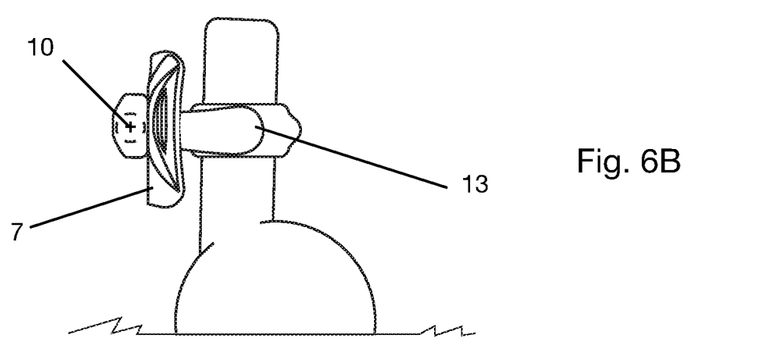
Figure 6C:
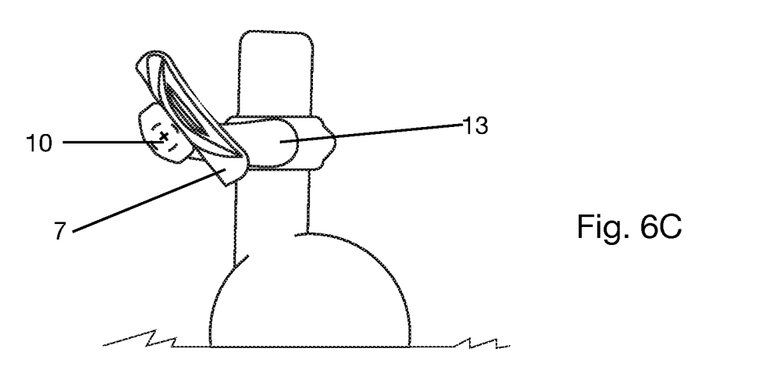
Figure 9:
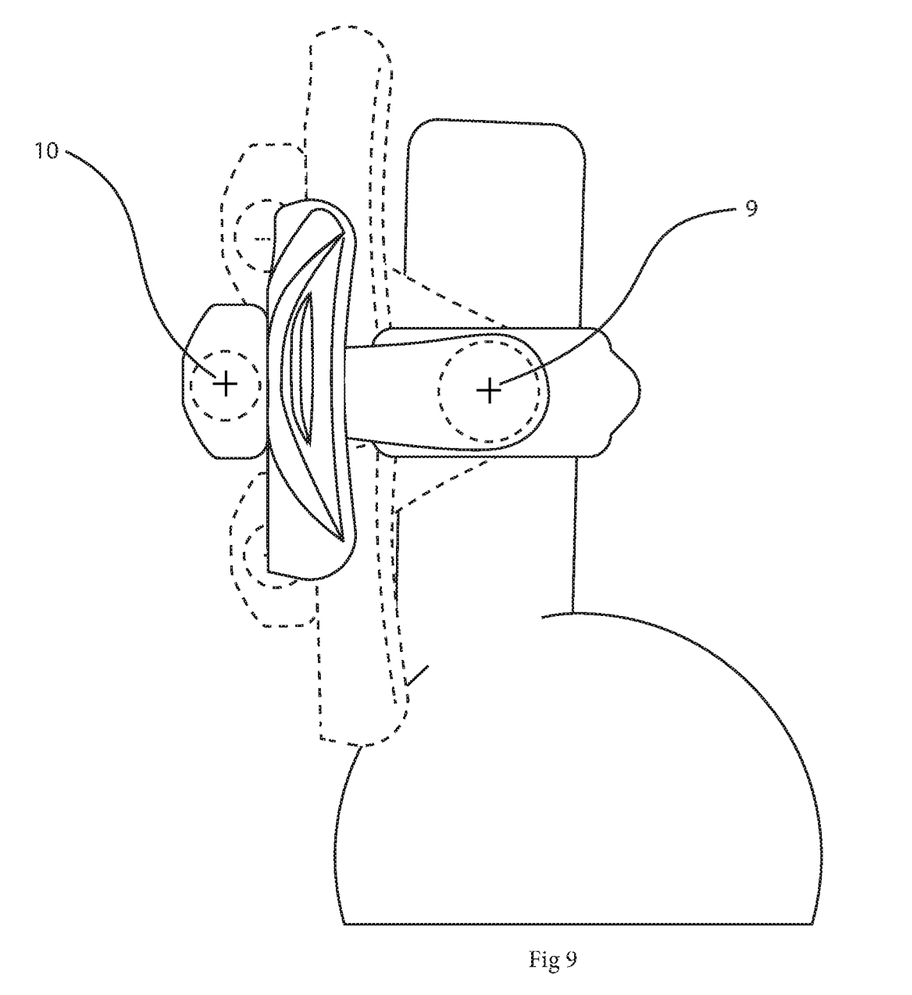
FIG. 9 shows a left side view of the present invention with the same movement as FIGS. 8A-8C.

Referring to FIG. 9, efficient force transmission can occur through maintaining a combination linear and rotational degrees of freedom of the assembly 11 in reference to the anchor body part. A purely rotational degree of freedom of the pad 7 would not keep the pad 7 aligned to the body segment, creating a shearing effect under load as seen in FIGS. 6A-C. A strictly linear degree of freedom would not be ideal since that would allow for sliding of the pad parallel to the bone once in motion, for example the movement seen in FIG. 2. These issues can be avoided in the present invention due to the shaft clamp fixturing mechanism 4. By tying two radial degrees of freedom together between the pad 7 and the support arm 13, the structural component of the exoskeleton is kept in parallel with the body as shown in FIG. 9. In some embodiments, the connection between the pad 7 and the support arm 13 can be confined to two, perpendicular, axis of rotation—without any additional degrees of freedom. Further, in such an embodiment, one of the two axis of rotation can be parallel to an axis of rotation of the support arm 13 at the opposite end, where the support arm 13 is rotationally mated to the clamp 3. While the clamp 3 can be linearly adjusted along the support 8, the clamp is fixed relative to the support during use of the exoskeleton. Through this configuration, the mounting system 11 can allow for some fine movements to retain the user's range of motion and comfort, without compromising force transmission efficacy.

It will be appreciated by those skilled in the art that various changes and modifications can be made to the illustrated embodiments without departing from the spirit of the present disclosure. All such modifications and changes are intended to be covered by the appended claims.

What is claimed is:

1. An attachment device for a biomechanical exoskeleton, the attachment device comprising,
    a support bracket configured to be fixed to a support of an exoskeleton;
    a support arm pivotally supported by the support bracket about a first axis at a first end; and
    a fixation pad pivotally connected to a second end of the support arm about a second axis and a third axis,
    wherein the first and second axis are parallel to one another, and
    wherein the third axis is perpendicular to the second axis.

2. The attachment device of claim 1, wherein the support bracket is a clamp and a clamping pin configured to fix the clamp relative to the exoskeleton.

3. The attachment device of claim 2, wherein the clamp is configured to slide along the support of the exoskeleton when the clamp is not fixed by the clamping pin.

4. The attachment device of claim 1, wherein fixation pad is constrained to only pivot about the second and third axes relative to the support arm.

5. The attachment device of claim 4, wherein the support arm is constrained to only rotate about the first axis relative to the support bracket.

6. The attachment device of claim 1, wherein the support arm is constrained to only rotate about the first axis relative to the support bracket.

7. The attachment device of claim 1, further comprising, an attachment strap having a first end fixed to the fixation pad and a second end releasably attached to the fixation pad.

8. The attachment device of claim 1, wherein the fixation pad is configured to naturally realign relative to a user during use.

9. The attachment device of claim 8, wherein the fixation pad is configured to maintain contact with the user without applying sheer forces.

10. An exoskeleton, the exoskeleton comprising,
    an upright support;
    an actuated pivot at a distal end of the upright support;
    a clamp configured and arranged to slide linearly along a proximal end of the support to adjust a relative height of a pad,
    a support arm pivotally connected to the clamp at a first end;
    the pad being pivotally connected to the support arm at a second end,
    wherein the pad is configured and arranged to maintain a fixed distance between the pad and the actuated pivot when attached to a user and the exoskeleton is in use,
    wherein the pad is constrained to three rotational degrees of freedom relative to the upright support.

11. The exoskeleton of claim 10, wherein the pad is configured to not apply any sheer forces to the user during use.

12. The exoskeleton of claim 10, wherein movement of the support arm is constrained to a single rotational degree of freedom relative to the clamp.

13. The exoskeleton of claim 12, wherein movement of the pad is constrained to two degrees of rotational freedom relative to the support arm.

14. The exoskeleton of claim 13, wherein the clamp is fixed relative to the upright support during use.

15. The exoskeleton of claim 10, wherein movement of the pad is constrained to two degrees of rotational freedom relative to the support arm.

16. The exoskeleton of claim 15, wherein the clamp is fixed relative to the upright support during use.

17. The exoskeleton of claim 10, wherein the clamp is fixed relative to the upright support during use.

18. The exoskeleton of claim 10, wherein two of the three rotational degrees of freedom are parallel to one another and one is perpendicular to the two parallel rotational degrees of freedom.

* * * * *